US008628016B2

(12) United States Patent
Winegar (10) Patent No.: US 8,628,016 B2
(45) Date of Patent: Jan. 14, 2014

(54) TERMINAL OPERATIVE FOR STORING FRAME OF IMAGE DATA

(75) Inventor: Keith F. Winegar, Lino Lakes, MN (US)

(73) Assignee: Hand Held Products, Inc., Fort Mill, SC (US)

( * ) Notice: Subject to any disclaimer, the term of this patent is extended or adjusted under 35 U.S.C. 154(b) by 38 days.

(21) Appl. No.: 13/162,600

(22) Filed: Jun. 17, 2011

(65) Prior Publication Data

US 2012/0320235 A1    Dec. 20, 2012

(51) Int. Cl.
*G06K 7/10*    (2006.01)
(52) U.S. Cl.
USPC ....................................................... 235/472.01
(58) Field of Classification Search
USPC ............... 455/450, 556; 348/231; 235/472.01
See application file for complete search history.

(56) References Cited

U.S. PATENT DOCUMENTS

| | | | |
|---|---|---|---|
| 6,356,664 B1 | 3/2002 | Dunn et al. |
| 7,372,485 B1 | 5/2008 | Bodnar et al. |
| 7,418,146 B2 | 8/2008 | Watanabe et al. |
| 7,428,002 B2 | 9/2008 | Monroe |
| 7,432,987 B2 | 10/2008 | Shan et al. |
| 7,447,332 B2 | 11/2008 | Horii et al. |
| 7,525,570 B2 | 4/2009 | Kiely et al. |
| 7,586,536 B2 | 9/2009 | Kato et al. |
| 7,620,257 B2 | 11/2009 | Tanaka et al. |
| 7,649,938 B2 | 1/2010 | Chen et al. |
| 7,720,295 B2 | 5/2010 | Watanabe et al. |
| 7,724,281 B2 | 5/2010 | Vale et al. |
| 7,742,077 B2 | 6/2010 | Sablak et al. |
| 7,777,780 B2 | 8/2010 | Oya et al. |
| 7,847,820 B2 | 12/2010 | Vallone et al. |
| 7,847,833 B2 | 12/2010 | Easwar et al. |
| 7,881,715 B2 | 2/2011 | Kirani et al. |
| 7,889,229 B2 | 2/2011 | Chang et al. |

(Continued)

FOREIGN PATENT DOCUMENTS

JP    2001078136 A    3/2001

OTHER PUBLICATIONS

Communication dated Oct. 10, 2012 in European Patent Application No. 12171111.3-2210 enclosing European Search Report under R. 61 or R. 63 EPC. 3 pages.

(Continued)

*Primary Examiner* — Daniel Hess
*Assistant Examiner* — Steven J Malone
(74) *Attorney, Agent, or Firm* — Additon, Higgins, Pendleton & Ashe, P.A.

(57) ABSTRACT

There is set forth herein an imaging terminal having a picture taking mode of operation. In the picture taking mode of operation the terminal can capture a frame of image data into a buffer memory prior to activation of a trigger signal. The terminal can be operative so that responsively to activation of a trigger signal, the terminal transmits one or more frames of the buffer memory to a storage memory. The terminal can further be operative so that responsively to activation of a trigger signal an operator is presented with indicators of frames captured both prior to and subsequent to the activation of the trigger signal. The terminal can be operative so that an operator can select for archiving one or more frame. The one or more frame can comprise one or more frame captured prior to activation of a trigger signal and one or more frame captured subsequent to activation of a trigger signal.

9 Claims, 10 Drawing Sheets

(56) References Cited

U.S. PATENT DOCUMENTS

| | | | |
|---|---|---|---|
| 2002/0065872 A1 | 5/2002 | Genske et al. |
| 2002/0096564 A1 | 7/2002 | Bellis et al. |
| 2006/0061670 A1 | 3/2006 | Butterworth |
| 2007/0002163 A1 | 1/2007 | Madej et al. |
| 2008/0106597 A1 | 5/2008 | Amini et al. |
| 2008/0144885 A1 | 6/2008 | Zucherman et al. |
| 2008/0198268 A1 | 8/2008 | Tullberg |
| 2008/0207262 A1 | 8/2008 | Shimizu et al. |
| 2008/0211910 A1 | 9/2008 | Niem et al. |
| 2008/0212685 A1 | 9/2008 | Masten |
| 2008/0239093 A1 | 10/2008 | Easwar et al. |
| 2008/0261605 A1 | 10/2008 | Larsen |
| 2008/0278580 A1 | 11/2008 | Bentkovski |
| 2008/0294588 A1 | 11/2008 | Morris et al. |
| 2008/0303903 A1 | 12/2008 | Bentley et al. |
| 2008/0309760 A1 | 12/2008 | Joyner et al. |
| 2009/0026571 A1 | 1/2009 | Inagaki et al. |
| 2009/0086025 A1 | 4/2009 | Ngu et al. |
| 2009/0135273 A1 | 5/2009 | Kusaka et al. |
| 2009/0141117 A1 | 6/2009 | Elberbaum |
| 2009/0158364 A1 | 6/2009 | Swamidas |
| 2009/0219411 A1 | 9/2009 | Marman et al. |
| 2009/0219433 A1 | 9/2009 | Higuchi et al. |
| 2009/0273684 A1 | 11/2009 | Sambonsugi |
| 2009/0278937 A1 | 11/2009 | Botchen et al. |
| 2009/0288011 A1 | 11/2009 | Piran et al. |
| 2010/0008649 A1 | 1/2010 | Watanabe et al. |
| 2010/0177207 A1 | 7/2010 | Fukuda |
| 2010/0265344 A1 | 10/2010 | Velarde et al. |
| 2011/0032387 A1 | 2/2011 | Takahashi |
| 2011/0034176 A1* | 2/2011 | Lord et al. | 455/450 |
| 2011/0040771 A1 | 2/2011 | Gilyadov et al. |
| 2011/0096168 A1 | 4/2011 | Siann et al. |
| 2011/0128150 A1 | 6/2011 | Kanga et al. |
| 2011/0128403 A1 | 6/2011 | Easwar et al. |
| 2011/0143811 A1* | 6/2011 | Rodriguez | 455/556.1 |
| 2011/0285874 A1* | 11/2011 | Showering et al. | 348/231.99 |

OTHER PUBLICATIONS

Oct. 22, 2012 Communication pursuant to Article 94(3) EPC in European Application No. 12171111.3.

* cited by examiner

TERMINAL OPERATIVE FOR STORING FRAME OF IMAGE DATA

FIELD OF THE INVENTION

The invention relates to registers generally and specifically to optical based registers

BACKGROUND OF THE PRIOR ART

Imaging assemblies are finding use in an expanding range of commercially available terminals. Digital cameras have been available for many years and are commonly equipped with CMOS or CCD image sensors that incorporate Bayer pattern filters. Bar code readers are commercially available having imaging assemblies that are CMOS or CCD based. Portable data terminals as well as mobile telephones are now commercially available having imaging assemblies of a variety of different technologies, e.g., CMOS or CCD.

SUMMARY OF THE INVENTION

There is set forth herein an imaging terminal having a picture taking mode of operation. In the picture taking mode of operation the terminal can capture a frame of image data into a buffer memory prior to activation of a trigger signal. The terminal can be operative so that responsively to activation of a trigger signal, the terminal transmits one or more frames of the buffer memory to a storage memory. The terminal can further be operative so that responsively to activation of a trigger signal an operator is presented with indicators of frames captured both prior to and subsequent to the activation of the trigger signal. The terminal can be operative so that an operator can select for archiving one or more frame. The one or more frame can comprise one or more frame captured prior to activation of a trigger signal and one or more frame captured subsequent to activation of a trigger signal.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

There is set forth herein an imaging terminal having a picture taking mode of operation. In the picture taking mode of operation the terminal can capture a frame of image data into a buffer memory prior to activation of a trigger signal. Also or alternatively responsively to a trigger signal activation, one or more frame stored in a buffer memory can be transmitted to a storage memory. The terminal can further be operative so that responsively to activation of a trigger signal an operator is presented with indicators of frames captured both prior to and subsequent to the activation of the trigger signal. The terminal can be operative so that an operator can select for archiving one or more frame. The one or more frame can comprise one or more frame captured prior to activation of a trigger signal. The terminal is operative therefore so that a frame captured prior to a time of activation of a trigger signal can be stored, allowing storage of a frame corresponding to a "just missed" scene.

Figure 1:
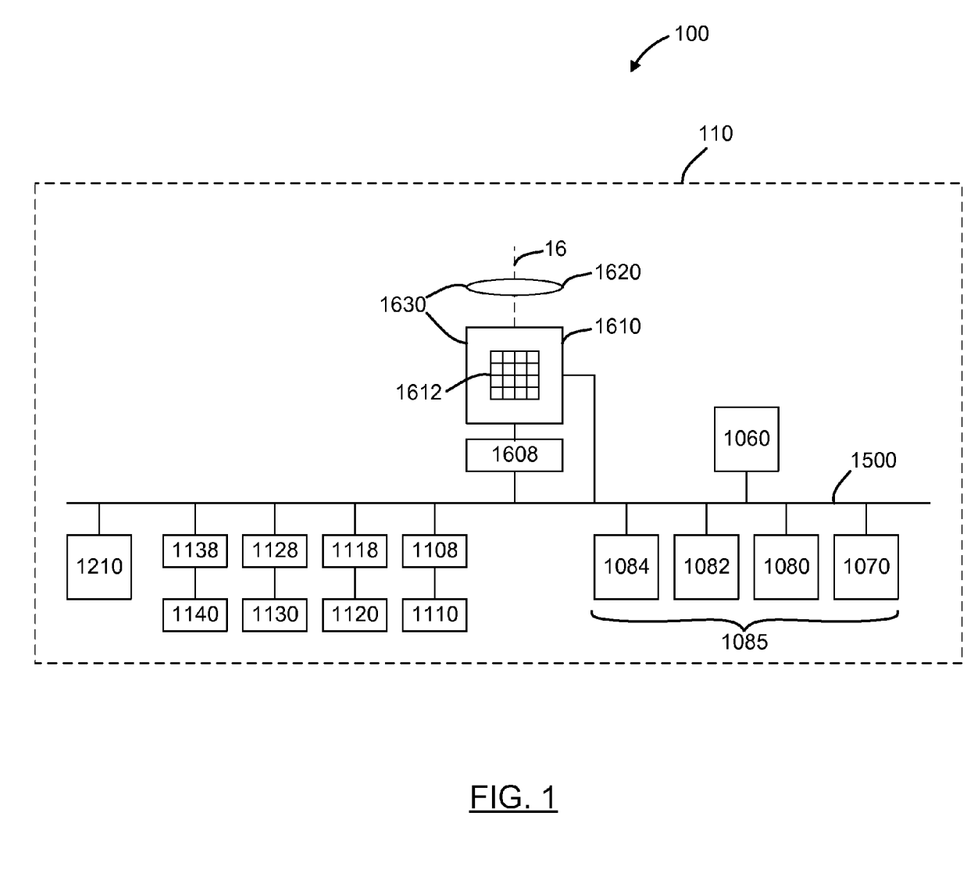
FIG. 1 is a block diagram of a terminal having an imaging assembly.

A hardware platform suitable for support of features set forth herein is shown in FIG. 1.

A block diagram illustrating exemplary components of the terminal 100 according to the invention is shown in FIG. 1. In one embodiment, terminal 100 can include a CPU 1060 in communication with a memory 1085 via a system bus 1500. The memory 1085 can include one or more of a volatile memory 1080, e.g., a random access memory (RAM), a non-volatile memory 1082 e.g., a read only memory (ROM), and a storage memory 1084, e.g., a hard drive, a CD, a floppy and/or a flash memory device. Memory 1080, memory 1082, and memory 1084 can be regarded as recording medium.

In one aspect, terminal 100 can include a trigger 1110, a pointer mechanism 1120, a keyboard 1130, and a display 1140. Each of the devices 1110, 1120, 1130, and 1140 can be communicatively coupled to system bus 1500 for communicating with the CPU 1060 via respective interfaces 1108, 1118, 1128, and 1138.

In another aspect, terminal 100 can include a communication interface 1210 for communicating with external computers. The communication interface can be provided by a wireline communication interface (e.g., an Ethernet interface or a USB interface) or a wireless communication interface (e.g., an IEEE 802.11 compliant wireless communication interface or a Bluetooth interface). Terminal 100 can include more than one or more communication interfaces 1210.

In one embodiment, terminal 100 can be provided by a portable data terminal (e.g., bar code reading terminal). In another embodiment, terminal 100 can have suitable hardware and software as to be operative as a mobile telephone.

In one embodiment, terminal 100 can include imaging assembly 1630. In a further aspect, the imaging assembly 1630 can be provided by a monochrome imaging assembly or a color imaging assembly.

In a further aspect, the imaging assembly 1630 can include an image sensor pixel array 1612 provided on an image sensor 1610 and an imaging lens assembly 1620 for focusing light onto image sensor pixel array 1612. Imaging assembly 1630 can have an imaging axis 16. In one embodiment, the image sensor 1610 can include a monochrome image sensor pixel array 1612 having a plurality of monochrome pixels disposed in a 2D array comprising a plurality of rows and columns. In a further aspect, the image sensor pixel array 1612 can be a monochrome image sensor pixel array devoid of color filters so that pixels of array 1612 are sensitive to light in substantially all wavelengths in the visible spectrum. In another embodiment, image sensor pixel array 1612 can have a color filter array, e.g., a Bayer pattern filter.

In a further aspect, image sensor 1610 can be provided in an image sensor integrated circuit having output processing circuitry for amplifying and digitizing image signals output by image sensor pixel array 1612. For capture of a frame of image data, image signals representing light incident on pixels of array 1612 can be read out of image sensor pixel array 1612, digitized and stored into system volatile memory 1080. Prior to performing the read out operation, pixels of array 1612 can be exposed during an exposure period. Signals for control of image sensor 1610, e.g., readout and exposure signals can be input by interface 1608 which can be communicatively coupled to system bus 1500 for providing communication with CPU 1060. In one embodiment, interface 1608 can be provided by a Media Control Processor (MCP) interface.

Imaging terminal 100 can be operative so that terminal 100 captures a frame of image data responsively to trigger 1110 being actuated. Terminal 100 can also be operative so that terminal 100 captures a frame of image data responsively to a picture taking mode being activated. A frame captured into memory 1080 prior to further processing by CPU 1060 can be regarded as a raw frame of image data.

In one embodiment as set forth herein imaging assembly 1630 can be a monochrome imaging assembly having a monochrome image sensor 1610. In another embodiment, assembly 1630 can be a monochrome imaging assembly. In another embodiment, imaging assembly 1630 can be a color imaging assembly. Where image sensor 1610 is a color image sensor, image sensor pixel array 1612 can include a Bayer pattern filter.

In another aspect, a frame of image data captured with use of imaging assembly 1630 can be subject to an attempt to decode. For attempting to decode a bar code symbol, e.g., a one dimensional bar code symbol, the terminal 100 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. In one embodiment, the terminal 100 can be operative to capture a frame of image data and process the frame for attempting to decode the frame responsively to an actuation of trigger 1110. When processing a color frame of image data for attempting to decode a decodable indicia, the system 100 can first transform the color image data into monochrome image data. Such transformation can comprise utilizing image data from only a single channel of pixel positions (e.g., by interpolating pixel values for blue and red pixel positions utilizing pixel values at green pixel positions so that an all green frame is output, which can be regarded as a monochrome frame of image data).

In one embodiment, the terminal 100 can, responsively to an actuation of the trigger 1110 to activate a trigger signal and/or activation of a mode of operation, capture a frame of image data and subject image data of a frame to a decode attempt. Also, responsively to an actuation of the trigger 1110 to activate a trigger signal and/or activation of a mode of operation, the terminal 100 can format image data of a captured frame into a standard image format, e.g., BMP, PDF, JPG, TIF and can transmit the formatted image file to an external computer, e.g., server 200, server 400, client computer 500.

Figure 2:
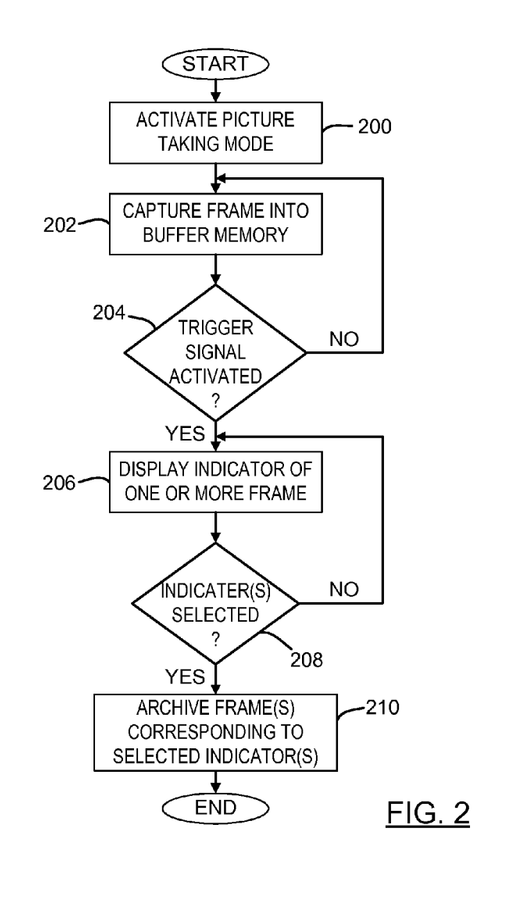
FIG. 2 is a flow diagram illustrating a picture taking mode of operation.

A flow diagram illustrating operation of terminal 100 during performance of a picture taking mode as set forth herein is shown in FIG. 2. At block 200 a picture taking mode is activated. In the case the picture taking mode is a default mode block 200 can comprise powering on terminal 100. Terminal 100 can be operative so that the described picture taking mode of FIG. 2 is activated by selection of a displayed menu indicator displayed on display 1140.

At block 202, terminal 100 can capture a frame of image data into a buffer memory, e.g., memory 1080. The frame captured at block 202 can be prior to activation of a trigger signal. At block 204, terminal 100 can determine if a trigger signal has been activated. A trigger signal can be activated by activation of trigger 1110 which can be a physical trigger as shown in FIG. 2 or in another embodiment can be a displayed virtual trigger displayed on display 1140. If a trigger signal is not activated, terminal 100 can loop back to block 202 to continually buffer frames until a trigger signal is activated. In one embodiment, terminal 100 can be operative so that N frames can be buffered in memory 1080 at a given time. Prior to activation of a trigger signal, the N frames buffered in memory 1080 can be frames captured prior to activation of the trigger signal. Newest frames can be continuously added to the buffer memory, e.g., memory 1080 and oldest frames can be continually erased. Terminal 100 can be operative so that subsequent to activation of a trigger signal, buffer memory 1080 buffers N=J+K frames, including J frames captured prior to activation of the trigger signal, and K frames captured subsequent to the activation of the trigger signal. For such functionality, terminal 100 can be operable to buffer K frames responsively to activation of a trigger signal.

Figure 3:
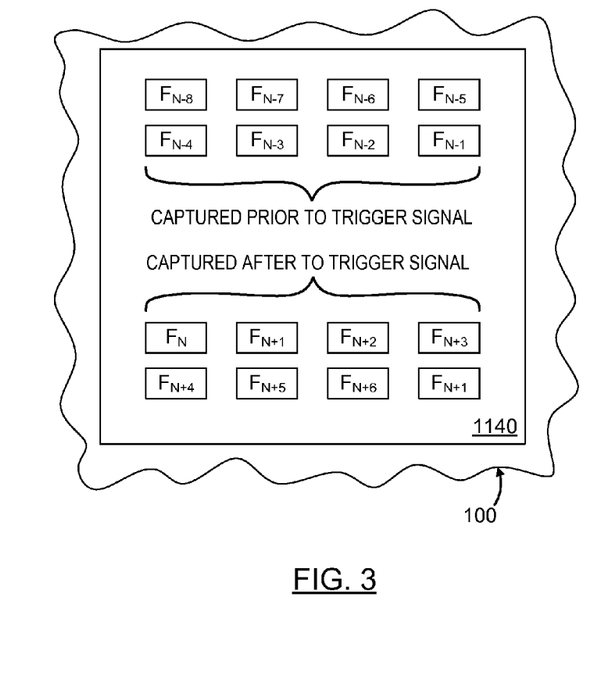
FIG. 3 is a depiction of an exemplary user interface.
Figure 4:
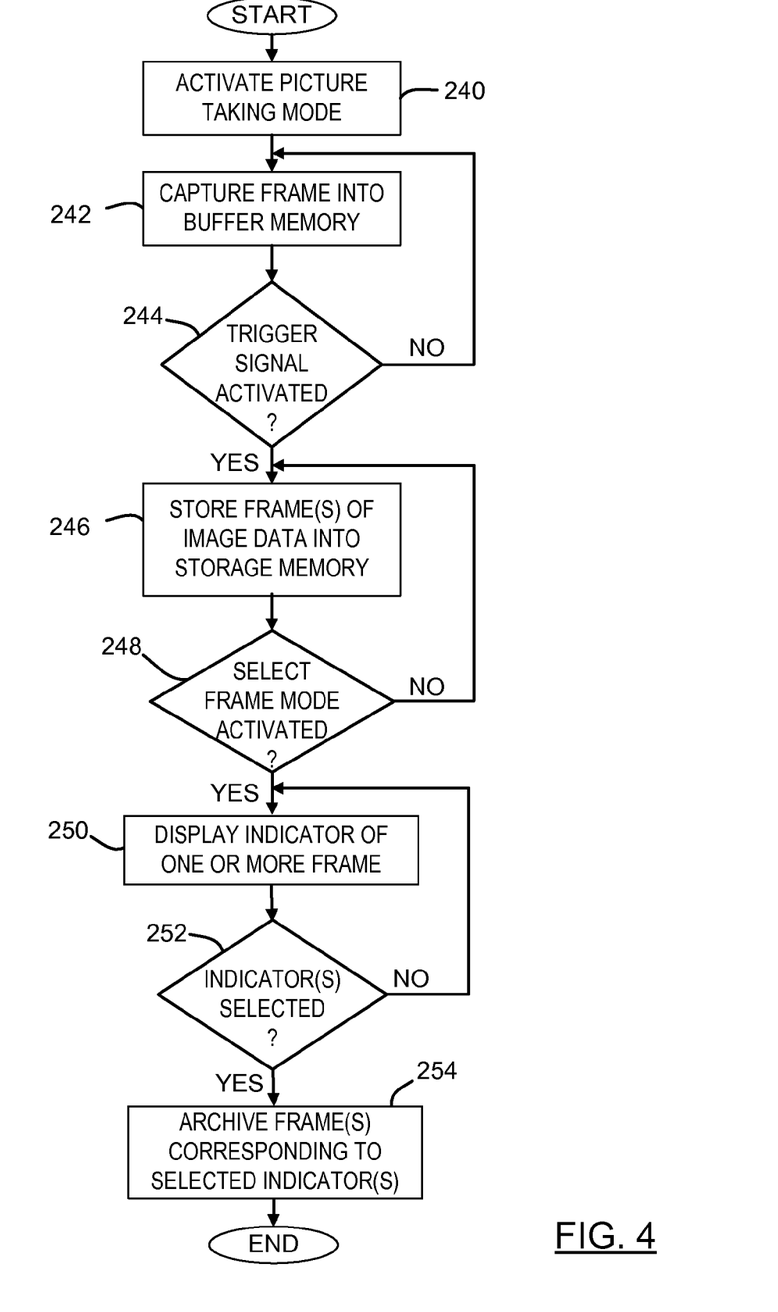
FIG. 4 is a flow diagram illustrating an alternative picture taking mode of operation.
Figure 5:
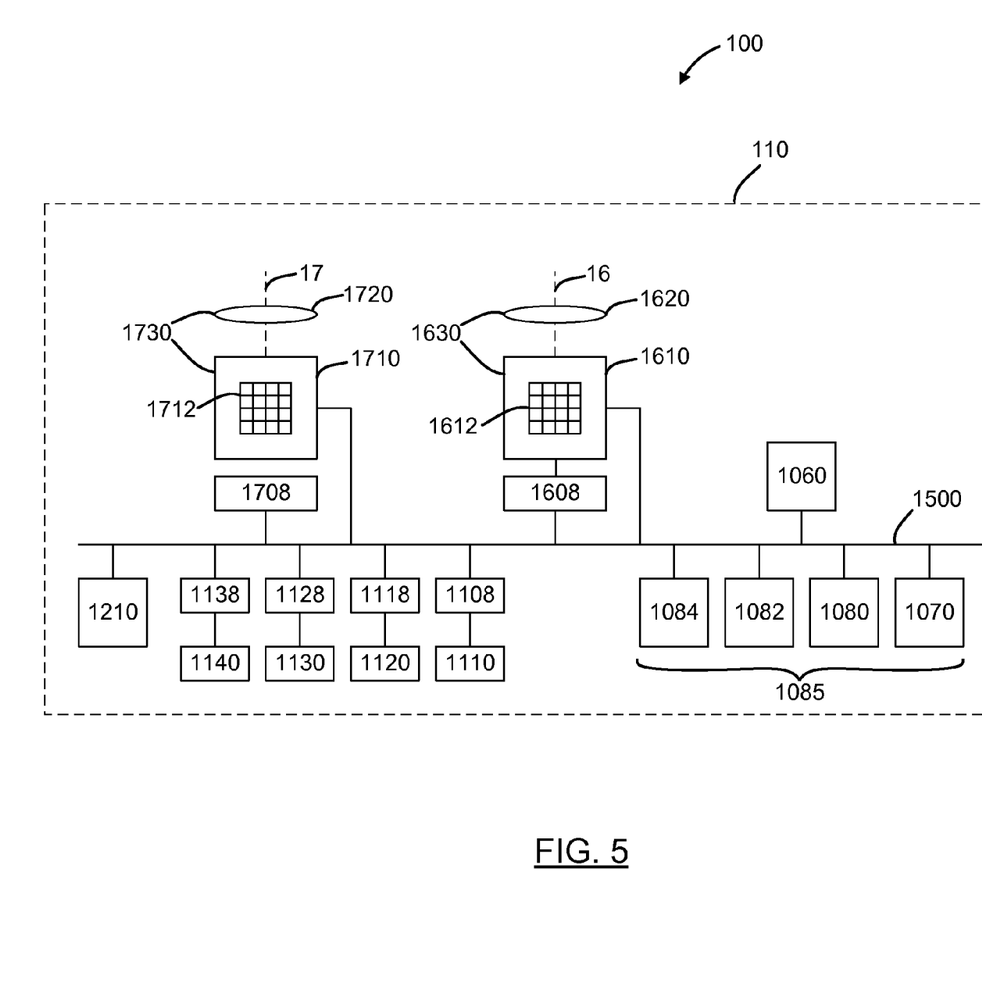
FIG. 5 is a block diagram of a terminal having a plurality of imaging assemblies.

If a trigger signal has been activated terminal 100 can proceed to block 206 to display on display 1040 indicators of one or more frames. The display of indicators at block 206 can be responsive to the trigger signal activation or alternately responsive to an operator activated mode selection. A depiction of a terminal displaying indicators $F_{N-8}$-$F_{N+7}$ of one or more frames is shown in FIG. 3. The indicators can be, e.g., thumbnails corresponding to one or more frames. For display of the thumbnails, terminal 100 can appropriately format frames while retaining the frames in a buffer memory provided by memory 1080 without transmission of the frames into storage memory 1084.

The one or more frame indicated by indicators $F_{N-8}$-$F_{N+8}$ can be one or more frame captured prior to the activation of the trigger signal and one or more frame captured subsequent to capture of the trigger signal. An operator at block 208 can select a desired one or more frame for archiving. Selecting an indicator herein can comprise "clicking on" the indicator. In response to a selection by an operator, terminal 100 at block 210 can archive the one or more frames. The archiving can comprise selectively storing the selected one or more frame into storage memory 1084.

Figure 9:
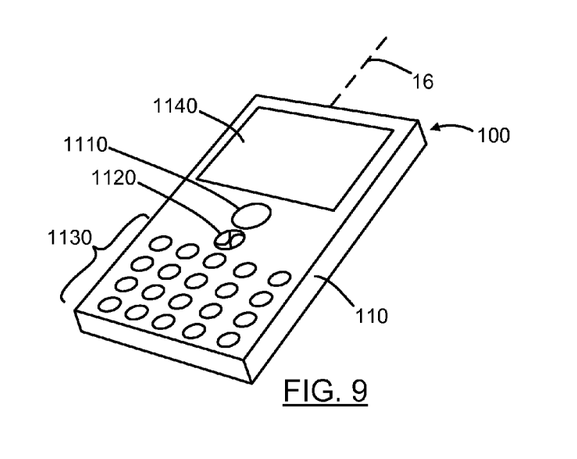
FIGS. 9-17 are physical form views of exemplary terminals.

An alternative embodiment of a picture taking mode is set forth with respect to FIG. 9. At block 240 a picture taking mode is activated. In the case the picture taking mode is a default mode, block 240 can comprise powering on terminal 100. Terminal 100 can be operative so that the described picture taking mode of FIG. 9 is activated by selection of a display menu indicator displayed on display 1140.

At block 242, terminal 100 can capture a frame of image data. At block 244, terminal 100 can determine if a trigger signal is activated. If a trigger signal is not activated, terminal 100 can loop back to block 242 to continually capture frames of image into a buffer memory until a trigger signal is activated. In one embodiment, terminal 100 can be operative so that N frames can be buffered in memory 1080 at a given time. Prior to activation of a trigger signal, the N frames can be frames captured prior to activation of the trigger signal. Newest frames can be continuously added to the buffer memory and oldest frames can be continually erased.

Terminal 100 can be operative so that subsequent to activation of a trigger signal, buffer memory 1080 buffers N=J+K frames, including J frames captured prior to activation of the trigger signal, and K frames captured subsequent to the activation of the trigger signal. Responsively to a trigger signal being activated, terminal 100 at block 246 can store one or more frame of image data into storage memory 1084. The storing at block 246 can comprise transmitting frames currently buffered in memory 1080 into memory 1084. For such functionality, terminal 100 can be operable to buffer K frames responsively to activation of a trigger signal.

At block 248, terminal 100 can determine whether a select frame mode has been selected. A select frame mode can be selected, e.g., by selecting a displayed menu indicator displayed on display 1140. In another embodiment, terminal 100 can be configured so that a select frame mode is selected by default. In one embodiment, terminal 100 can proceed to block 250 responsively to activation of a trigger signal without performance of block 248.

At block 250, indicators of frames can be displayed in the manner indicated by FIG. 3. The indicators can comprise thumbnails of frames provided by subjecting raw frames to appropriate formatting. At block 252, terminal 100 determines whether an indicator is selected. At block 254, terminal 100 can archive selected frames. The archiving can comprise maintaining selected frames in storage memory 1084 while erasing frames not selected at block 252.

Operation in accordance with the flow diagram of FIG. 2 is useful in many anticipated environments, including environments wherein the there are fast moving objects, e.g., a vehicle traffic environment, a team sporting event, an automated machine process. The method allows taking of pictures corresponding to events just missed. For example, with the processing, a frame representing a scene at a time prior to a time of activation of a trigger signal can be archived. An operator can utilize terminal 100 to take a picture of a scene including moving objects (e.g., machines, people). An operator can actuate a trigger 1110. To successfully take a picture representing an event, even if the trigger 1110 is actuated after an event has occurred. A frame representing the event occurring prior to a trigger signal activation may be archived by way of processing set forth herein.

Figure 6:
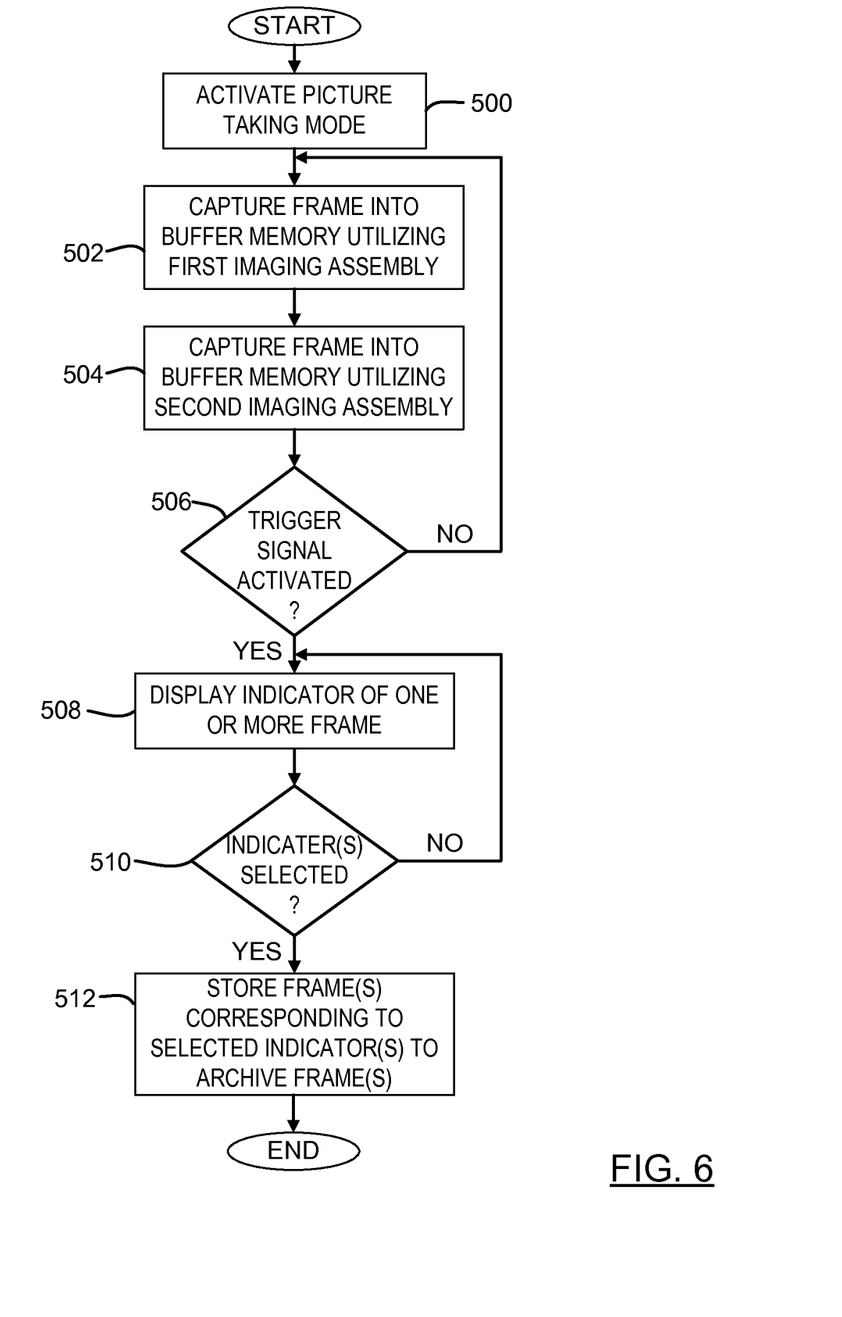
FIG. 6 is a flow diagram illustrating a picture taking mode.

A hardware diagram illustrating a terminal in an alternative embodiment is shown in FIG. 6. In the embodiment of FIG. 6, terminal 100 includes more than one imaging assembly, e.g., can include imaging assembly 1630 and imaging assembly 1730.

A block diagram illustrating exemplary components of the terminal according to the invention is shown in FIG. 6. In one embodiment, terminal 100 can include a CPU 1060 in communication with a memory 1085 via a system bus 1500. Memory 1085 can include one or more of a volatile memory 1080, e.g., a random access memory, (RAM), a non-volatile memory 1082 e.g., a read only memory (ROM) and a long-term storage memory 1084, e.g., a hard drive, a CD, a floppy and/or a flash memory device. Memory 1080, memory 1082, and memory 1084 can be regarded as recording medium.

In one aspect, terminal 100 can include a trigger 1110, a pointer mechanism 1120, a keyboard 1130, and a display 1140. Each of the devices 1110, 1120, 1130, and 1140 can be communicatively coupled to system bus 1500 for communicating with the CPU 1060 via respective interfaces 1108, 1118, 1128, and 1138.

In another aspect, terminal 100 can include a communication interface 1210 for communicating with external computers. The communication interface can be provided by a wireline communication interface (e.g., an Ethernet interface or a USB interface) or a wireless communication interface (e.g., an IEEE 802.11 compliant wireless communication interface or a Bluetooth interface). The system 100 can include more than one or more communication interfaces 1210.

In one embodiment, terminal 100 can be provided by a portable data terminal (e.g., bar code reading terminal). In another embodiment, terminal 100 can have suitable hardware and software as to be operative as a mobile telephone.

In another aspect, terminal 100 can include two or more imaging assemblies. In one embodiment, terminal 100 can include first and second imaging assemblies 1630 and 1730. In a further aspect, imaging assembly 1630 can be provided by a monochrome imaging assembly and the imaging assembly 1730 can be provided by a color imaging assembly. A skilled artisan would appreciate that terminals comprising three or more imaging assemblies can be provided.

In a further aspect, imaging assembly 1630 can include an image sensor pixel array 1612, a monochrome image sensor 1610 and an imaging lens assembly 1620 for focusing light onto image sensor pixel array 1612. Imaging assembly 1630 can have an imaging axis 16. The image sensor 1610 can include a monochrome image sensor pixel array 1612 having a plurality of monochrome pixels disposed in a 2D array comprising a plurality of rows and columns. In a further aspect, the image sensor pixel array 1612 can be devoid of color filters so that pixels of array 1612 are sensitive to light in substantially all wavelengths in the visible spectrum. In another embodiment, image sensor 1610 can include a color image sensor pixel array 1612. In such embodiment, image sensor pixel array 1612 can include a color filter pattern e.g., a Bayer pattern.

In a further aspect, the image sensor 1610 can be provided in an image sensor integrated circuit having output processing circuitry for amplifying and digitizing image signals output by image sensor pixel array 1612. For capture of a frame of image data, image signals representing light incident on pixels of array 1612 can be read out of image sensor pixel array 1612, digitized and stored into system volatile memory 1080. Prior to performing the read out operation, pixels of array 1612 can be exposed during an exposure period. Signals for control of image sensor 1610, e.g., readout and exposure signals can be input by interface 1608 which can be communicatively coupled to system bus 1500 for providing communication with CPU 1060. In one embodiment, the interface 1608 can be provided by a Media Control Processor (MCP) interface.

Imaging terminal 100 can be operative so that terminal 100 captures a frame of image data responsively to trigger 1110 being actuated to activate a activated trigger signal. A frame captured into memory 1080 prior to further processing by CPU 1060 can be regarded as a raw frame of image data.

In a further aspect, imaging assembly 1730 can include an image sensor pixel array 1712, a color image sensor 1710 and an imaging lens assembly 1720 for focusing light axis. Imaging assembly 1730 can have an imaging axis 17. Image sensor pixel array 1712 can include a plurality of pixels disposed in a plurality of rows and columns of pixels. Image sensor pixel array 1712 can include a color filter pattern, e.g., Bayer pattern. In one embodiment, terminal 100 can be configured with suitable optics so that imaging axis 16 can be coincident with imaging axis 17. However, in another embodiment, terminal 100 can be configured so that imaging axis 16 and imaging axis 17 are spaced apart from one another. Terminal 100 can be configured so that axes 16 and 17 can extend in directions that are parallel to one another as shown in FIG. 2. In another embodiment, terminal 100 can be configured so that axes 16 and 17 extend in directions that are non-parallel with respect to one another. In one specific embodiment, terminal 100 can be configured so that imaging axis 16 extends forwardly from terminal 100 and imaging axis extends downwardly from terminal 100. Imaging axis directions herein are given as directions from an image sensor pixel array toward a target being subject to image capture. In one embodiment, terminal 100 can be configured so that imaging assembly 1630 and imaging assembly 1730 define respective fields of view that at least partially overlap.

In another aspect, image sensor 1710 can be provided in an image sensor integrated circuit having output processing circuitry for amplifying and digitizing image signals output by image sensor pixel array 1712. For capture of a frame of image data, image signals representing light incident on pixels of array 1712 can be read out of image sensor pixel array 1712, digitized and stored into system volatile memory 1080. Prior to performing the read out operation, pixels of array 1712 can be exposed during an exposure period. Signals for control of image sensor 1710, e.g., readout and exposure signals can be input by interface 1708 which can be communicatively coupled to system bus 1500 for providing communication with CPU 1060. In one embodiment, the interface 1708 can be provided by a Media Control Processor (MCP) interface.

In one embodiment as set forth herein imaging assembly 1630 can be a monochrome imaging assembly having a monochrome image sensor 1610, and imaging assembly 1730 can be a color imaging assembly having a color image sensor 1710.

Imaging terminal 100 can be operative so that terminal 100 captures a frame of image data responsively to trigger 1110 being actuated. A frame captured into memory 1080 prior to further processing by CPU 1060 can be regarded a raw frame.

In another aspect, for attempting to decode a bar code symbol, e.g., a one dimensional bar code symbol, the terminal 100 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. In one embodiment, the terminal 100 can be operative to capture a frame of image data and process the frame for attempting to decode the frame responsively to an actuation of trigger 1110. When processing a color frame of image data for attempting to decode a decodable indicia, the system 100 can first transform the color image data into monochrome image data. Such transformation can comprise utilizing image data from only a single channel of pixel positions (e.g., by interpolating pixel values for blue and red pixel positions utilizing pixel values at green pixel positions so that an all green frame is output, which can be regarded as a monochrome frame of image data).

In one embodiment, the terminal 100 can, responsively to an actuation of the trigger 1110 for activation of a trigger signal, capture a frame of image data and subject image data of a frame to a decode attempt. Also, responsively to an actuation of the trigger 1110 for activation of a trigger signal, the terminal 100 can format image data of a captured frame into a standard image format, e.g., BMP, PDF, JPG, TIF and can transmit the formatted image file to an external computer.

A flow diagram illustrating terminal 100 having more than one imaging assembly 1630, 1730 and operating in an exemplary picture taking mode is shown in FIG. 6. At block 500 a picture taking mode is activated. In the case the picture taking mode is a default mode, block 500 can comprise powering on the terminal 100. Terminal 100 can be operative so that the described picture taking mode of FIG. 6 is activated by an operator selection of a displayed menu indicator displayed on display 1140.

At block 502 terminal 100 can utilize imaging assembly 1630 to capture a frame of image data into a buffer memory, e.g., memory 1080. At block 504 terminal 100 can utilize imaging assembly 1730 to capture a frame of image data into memory 1080. For utilizing a particular imaging assembly, e.g., assembly 1630, 1730, for capture of a frame, terminal 100 can cause image data to be read out of the respective image sensor pixel array 1612, 1712 of the array 1630, 1730. At block 506, terminal 100 determines if a trigger signal has been activated and if not loops back to blocks 502 and 504 to continually buffer frames into memory 1080.

In one embodiment, terminal 100 can be operative so that N frames can be buffered in memory 1080 at a given time. Prior to activation of a trigger signal, the N frames buffered in memory 1080 can be frames captured prior to activation of the trigger signal. Newest frames can be continuously added to the buffer memory and oldest frames can be continually erased.

Terminal 100 can be operative so that subsequent to activation of a trigger signal, buffer memory 1080 buffers N=J+K frames, including J frames captured prior to activation of the trigger signal, and K frames captured subsequent to the activation of the trigger signal.

Figure 7:
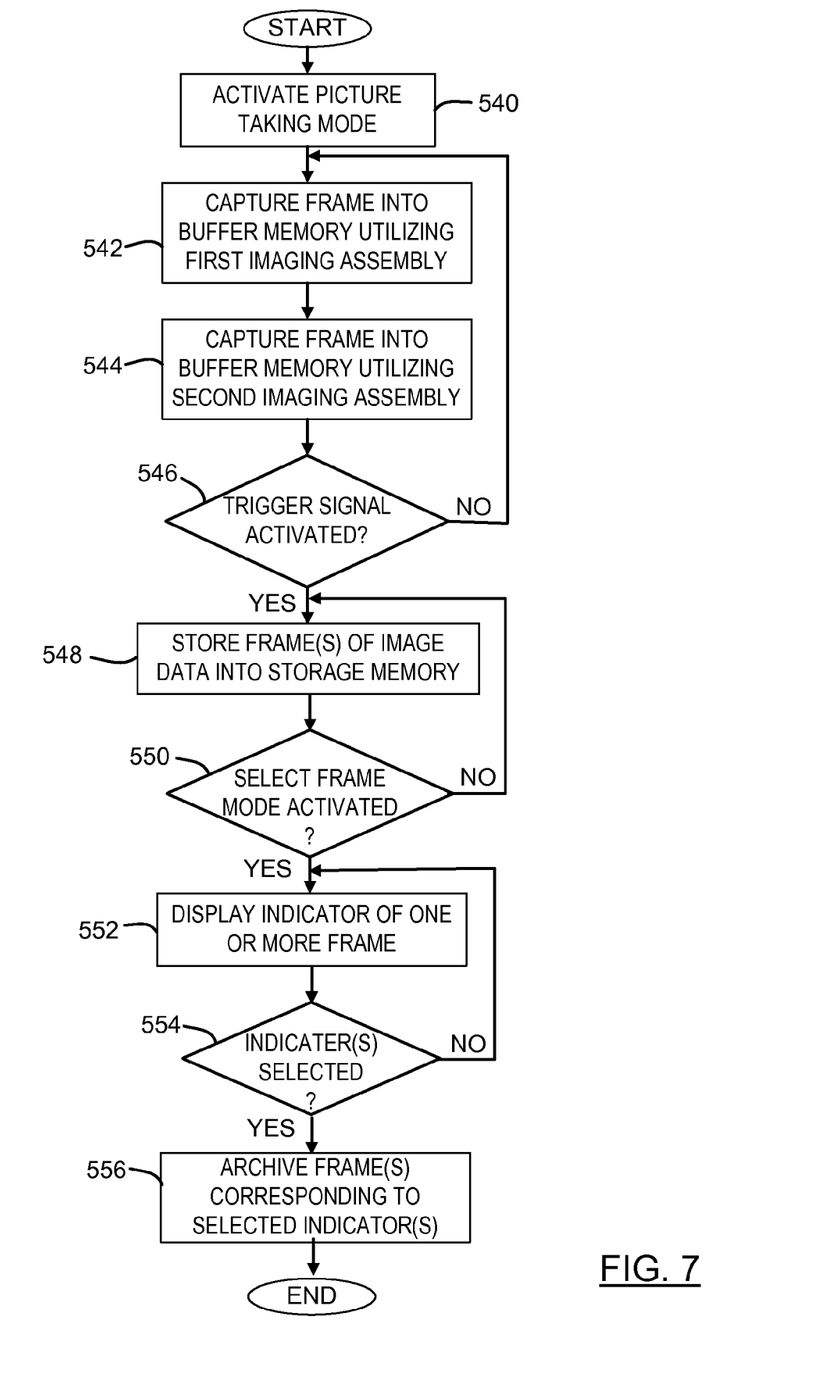
FIG. 7 is a depiction of an exemplary user interface.

If a trigger signal has been activated terminal 100 can proceed to block 508 to display on display 1140 indicators of one or more frames. A depiction of a terminal displaying indicators $FA_{N-4}$ to $FB_{N+3}$ of one or more frames is shown in FIG. 7. The indicators, can be e.g., thumbnails corresponding to one or more frames. Indicators including the "FA" designation in FIG. 7 correspond to frames captured utilizing imaging assembly 1630. Indicator including the "FB" designation in FIG. 7 correspond to frames captured utilizing image assembly 1730.

The one or more frame indicated by the indicators of FIG. 7 can be one or more frame captured prior to the activation of the trigger signal and one or more frame captured subsequent to capture of the trigger signal. An operator at block 510 can select a desired one or more frame for archiving. In response to a selection by an operator, terminal 100 at block 512 can store the one or more frame. The storing can comprise transmitting one or more frame corresponding to a selected indicator from buffer memory 1080 to memory 1084.

Figure 8:
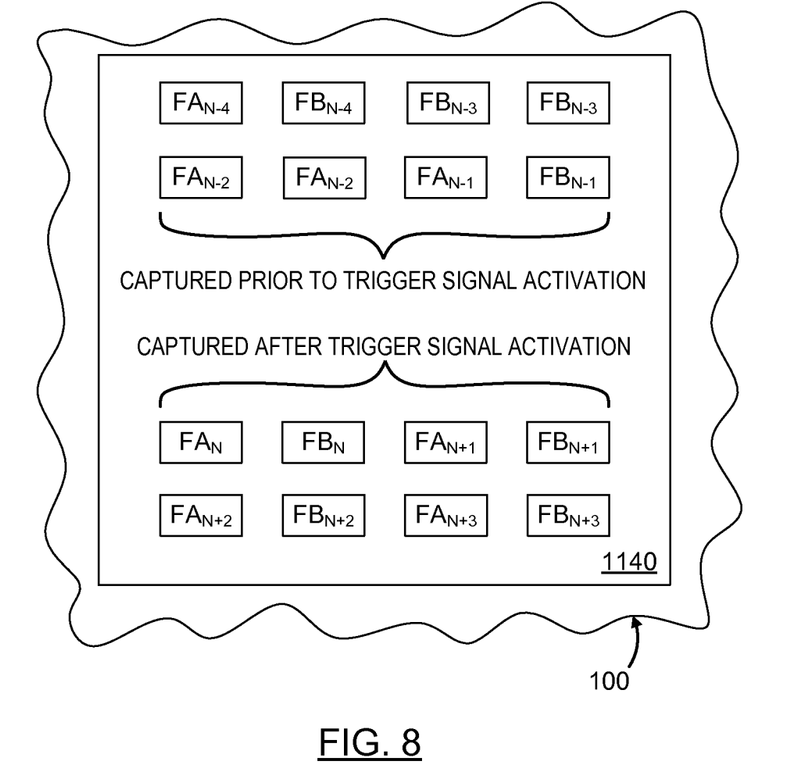
FIG. 8 is a flow diagram illustrating an alternative picture taking mode of operation.

A flow diagram illustrating terminal 100 having more than one imaging assembly 1630, 1730 and operating in another exemplary picture taking mode is shown in FIG. 8. At block 540 a picture taking mode is activated. In the case the picture taking mode is a default mode block 540 can comprise powering on the terminal 100. Terminal 100 can be operative so that the described picture taking mode of FIG. 8 is activated by an operator selection of a displayed menu indicator displayed on display 1140.

At block 542, terminal 100 can utilize imaging assembly 1630 to capture a frame of image data into a buffer memory, e.g., memory 1080. At block 544, terminal 100 can utilize imaging assembly 1730 to capture a frame of image data into memory 1080. At block 546, terminal 100 can determine if a trigger signal has been activated and if not loops back to blocks 542 and 544 to continually buffer frames into memory 1080. In one embodiment, terminal 100 can be operative so that N frames can be buffered in memory 1080 at a given time. Prior to activation of a trigger signal, the N frames buffered in memory 1080 can be frames captured prior to activation of the trigger signal. Newest frames can be continuously added to the buffer memory and oldest frames can be continually erased. Terminal 100 can be operative so that subsequent to activation of a trigger signal, memory 1080 buffers N=J+K frames, including J frames captured prior to activation of the trigger signal, and K frames captured subsequent to the activation of the trigger signal. For such functionality, terminal 100 can be operable to buffer K frames responsively to activation of a trigger signal.

Responsively to a trigger signal being activated, terminal 100 at block 548 can store one or more frame of image data into storage memory 1084. The storing at block 548 can comprise transmitting frames currently buffered in memory 1080 into memory 1084.

At block 550, terminal 100 can determine whether a select frame mode has been selected. A select frame mode can be selected, e.g., by selecting a displayed menu indicator displayed on display 1140. In another embodiment, terminal 100 can be configured so that a select frame mode is selected by default. In one embodiment, terminal 100 can proceed to block 552 responsively to activation of a trigger signal without performances of block 550.

At block 552, indicators of frames can be displayed in the manner indicated by FIG. 7. The indicators can comprise thumbnails of frames which can be provided by subjecting raw frames to appropriate formatting. At block 554, terminal 100 determines whether an indicator is selected. At block 556, terminal 100 can archive selected frames. The archiving can comprise retaining one or more selected frame in storage memory 1084 while erasing frames not selected at block 554.

Figure 10:
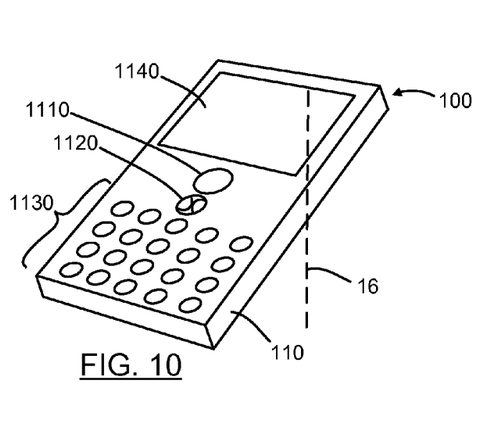
Figure 11:
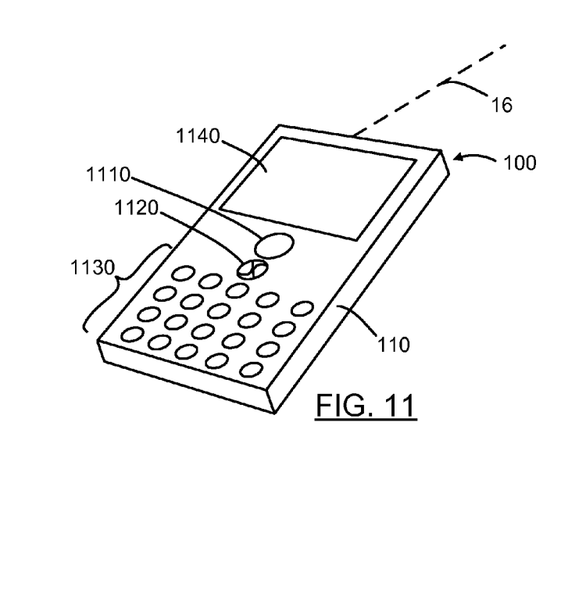
Figure 12:
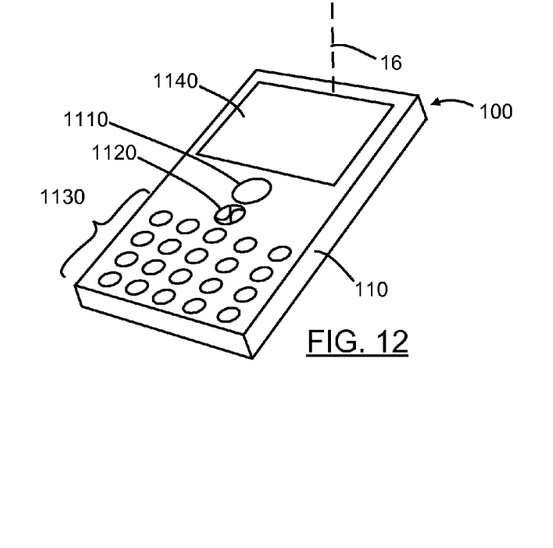
Figure 13:
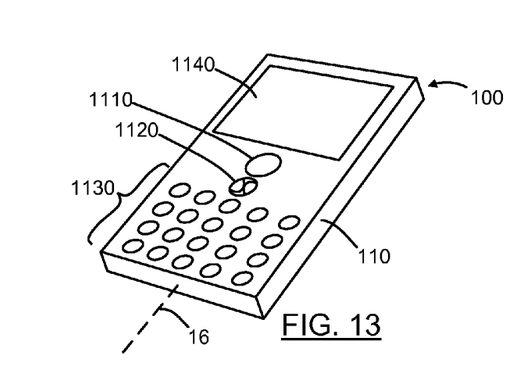

Various embodiments of terminal 100 having a single imaging assembly 1630 are shown in FIGS. 9-13. In the embodiment of FIG. 9, imaging axis 16 extends forwardly from terminal 100 and in a direction parallel to a plane of display 1140. In the embodiment of FIG. 10, imaging axis 16 extends downwardly from terminal 100 in a direction perpendicular to a plane of a display 1140. In the embodiment of FIG. 11, imaging axis 16 extends forwardly from terminal 100 and in particular extends forwardly and downwardly from terminal 100. In the embodiment of FIG. 12, imaging axis 16 extends upwardly from terminal 100. In the embodiment of FIG. 13, imaging axis 16 extends rearwardly of terminal 100 and in particular rearwardly and downwardly from terminal 100.

Figure 14:
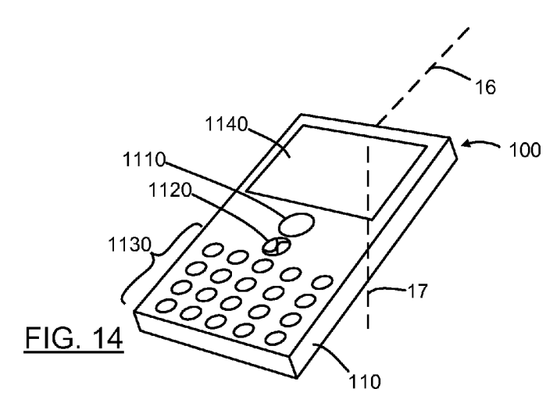
Figure 15:
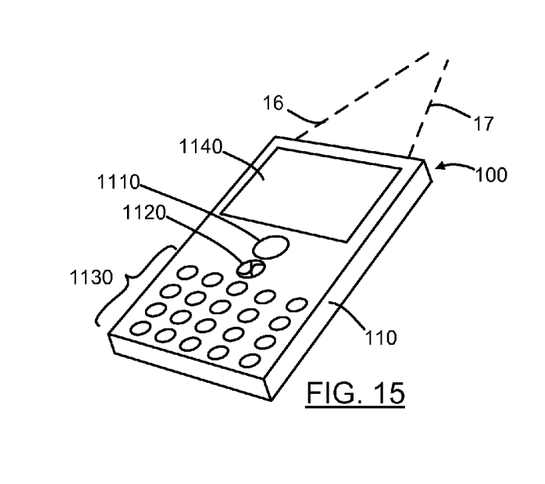
Figure 16:
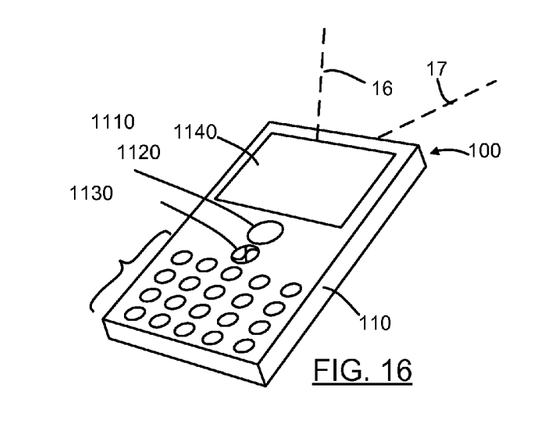
Figure 17:
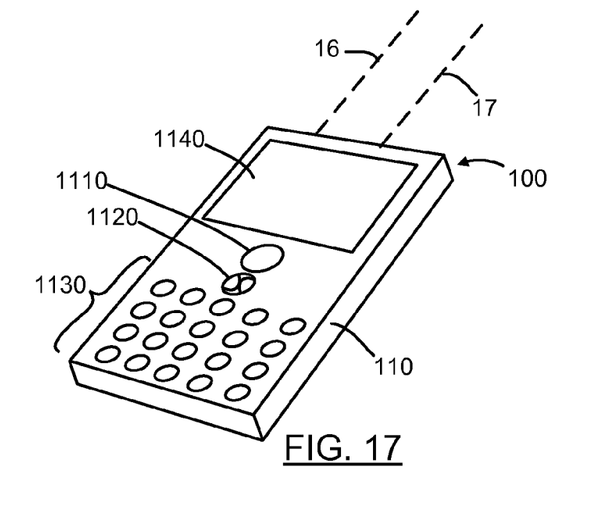

Various embodiments of terminal 100 having a plurality of imaging assemblies, e.g., assembly 1630 and assembly 1730 are shown in FIGS. 12-15. In the embodiment of FIG. 14 imaging axis 16 extends forwardly of terminal 100 in a direction parallel to a plane of display 1140 and imaging axis 17 extends downwardly from terminal 100 in a direction perpendicular to a plane of display 1140. In the embodiment of FIG. 15, each of imaging axis 16 and imaging axis 17 extend forwardly from terminal 100 in directions parallel to a plane of display and further extend in directions that are in converging relation. In the embodiment of FIG. 16, each of imaging axis 16 and imaging axis 17 extend forwardly from terminal 100 in directions parallel to a plane of display 1140 and further extend in directions that are in diverging relation. In the embodiment of FIG. 17, each of imaging axis 16 and imaging axis 17 extend forwardly and downwardly from terminal 100 in directions that are parallel to one another. In each of the embodiments of FIGS. 14-17, fields of view defined by imaging assembly 1630 and 1730 can be expected to partially overlap over a range of terminal to target distances. In the embodiment of FIGS. 9 and 17, terminal 100 can include a hand held housing 110 encapsulating imaging assembly 1630 and/or imaging assembly 1730.

"Forwardly" herein is inclusive of directions that are upwardly forwardly or downwardly forwardly. Similarly "upwardly" is inclusive of directions that are rearwardly upwardly or forwardly upwardly, "downwardly" is inclusive of directions that are rearwardly downwardly or forwardly downwardly, and "rearwardly" is inclusive of directions that are upwardly rearwardly or downwardly rearwardly.

Configured as described, terminal 100 is operative to archive a frame of image data captured prior to a time of activation of a trigger signal, i.e., a picture just missed. With a single imaging assembly, the just missed picture can be a picture corresponding to a single imaging assembly field of view. In a plural imaging assembly embodiment, the "just missed" picture can be a picture corresponding to alternative different fields of view.

In one embodiment, terminal 100 can be utilized for security applications. In one embodiment, terminal 100 can be deployed at a retail store e.g., at a checkout counter. Terminal 100 can be operative to continuously buffer frames of image data into a buffer memory, e.g. as can be provided by memory 1080, and, in one embodiment terminal 100 can be operative to subject buffered frames to attempts to decode a decodable indicia represented in the buffered frames as set forth herein. In one embodiment, terminal 100 can be disposed on a scan stand that fixes its position.

On witness of an unscrupulous activity e.g., theft, assault, a store clerk can operate terminal 100 to activate a trigger signal. Responsively to activation of a trigger signal, frames of a buffer memory, e.g. memory 1080 can be optionally subject to formatting (e.g., video file formatting) and can be stored in a storage memory, e.g. memory 1084 of terminal 100 as set forth herein. Provided the scene in which the unscrupulous activity took place is within a field of view of an imaging assembly of terminal 100, activation of a trigger signal can result in a video file depicting the unscrupulous activity being provided even though the trigger signal activation has occurred subsequent to the occurrence of the activity. A field of view of terminal 100 can be expanded by inclusion of a plurality of imaging assemblies, e,g, such as assemblies 1630, 1730 or additional imaging assemblies in terminal 100.

A small sample of systems methods and apparatus that are described herein is as follows:

A1. A terminal comprising:

an imaging assembly comprising an image sensor pixel array and an imaging lens focusing an image on the image sensor pixel array;

a hand held housing encapsulating the image sensor pixel array;

a display extending in a display plane disposed on the hand held housing;

a buffer memory;

a storage memory;

wherein the terminal is operative so that prior to activation of a trigger signal, the terminal captures into the buffer memory a plurality of frames of image data, the buffer memory buffering the plurality of frames;

wherein the terminal is configured so that subsequently to activation of a trigger signal the terminal is operative to display one or more indicator corresponding to one or more frame of the plurality of frames captured prior to the time of activation of the trigger signal;

wherein the terminal responsively to selection of a certain indicator of the one or more indicator by an operator archives the frame corresponding to the certain indicator.

A2. The terminal of A1, wherein the terminal responsively to the activation of the trigger signal captures in the buffer memory K frames, the K frames being captured subsequent to the time of activation of a trigger signal.

A3. The terminal of A1, wherein the terminal responsively to the activation of the trigger signal transmits one or more frames buffered in the buffer memory into the storage memory.

A4. The terminal of A1, wherein the terminal when the terminal archives the frame the terminal retains the frame in the storage memory and erases non-selected frames from the storage memory.

A5. The terminal of A1, wherein the terminal for display of the one or more indicator formats the one or more frame without transmitting the one or more frame into storage memory.

A6. The terminal of A1, wherein the terminal when the terminal archives the frame, the terminal stores the frame into the storage memory.

A7. The terminal of A1, wherein the terminal is operative to display the one or more indicator responsively to the activation of a trigger signal.

A8. The terminal of A1, wherein the terminal is operative to attempt to decode a decodable indicia a frame of the plurality of frames.

B1. A terminal comprising:
a first imaging assembly having a first imaging axis, a first image sensor pixel array, and an imaging lens focusing light on the image sensor pixel array;
a second imaging assembly having a second imaging axis, a second image sensor pixel array, and an imaging lens focusing light on the second image sensor pixel array;
a hand held housing encapsulating the first image sensor pixel array and the second image sensor pixel array;
a display extending in a display plane disposed on the hand held housing;
a buffer memory;
a storage memory;
wherein the terminal is operative so that prior to activation of a trigger signal the terminal captures into the buffer memory a plurality of frames of image data, the buffer memory buffering the plurality of frames, the plurality of frames being frames captured utilizing the first imaging assembly and the second imaging assembly;
wherein the terminal is configured so that subsequently to activation of a trigger signal the terminal is operative to display a plurality of indicators corresponding a set of frames captured prior to the time of activation of the trigger signal, the set of frames including one or more frame captured utilizing the first imaging assembly and one or more frame captured utilizing the second imaging assembly;
wherein the terminal responsively to selection of a certain indicator of the one or more indicator by an operator archives the frame corresponding to the certain indicator.

B2. The terminal of B1, wherein the terminal when the terminal archives the frame, the terminal retains a selected frame in the storage memory and erases non-selected frames from the storage memory.

B3. The terminal of B1, wherein the terminal responsively to activation of the trigger signal transmits one or more frame buffered in the buffer memory into the storage memory.

B4. The terminal of B1, wherein the terminal when the terminal archives the frame, stores the frame into the storage memory.

B5. The terminal of B1, wherein the terminal is adapted so that the first imaging axis extends forward from the terminal toward a target wherein the second imaging axis extends downward toward from the terminal toward a target.

B6. The terminal of B1, wherein the first imaging axis and the second imaging axis are in diverging relation.

B7. The terminal of B1, wherein the first imaging axis and the second imaging axis are in converging relation.

B8. The terminal of B1, wherein the terminal is operative to display the one or more indicator responsively to the activation of the trigger signal.

B9. The terminal of B1, wherein the terminal is operative to attempt to decode a decodable indicia a frame of the plurality of frames.

C1. A terminal comprising:
a first imaging assembly comprising a first image sensor pixel array and an imaging lens focusing an image on the image sensor pixel array;
a hand held housing encapsulating the first image sensor pixel array;
a buffer memory;
a storage memory;
wherein the terminal is operative so that prior to activation of a trigger signal, the terminal captures into the buffer memory a plurality of frames of image data, the buffer memory buffering the plurality of frames;
wherein the terminal is operative so that responsively to activation of the trigger signal the terminal transmits one or more frame of the plurality of frames to the storage memory.

C2. The terminal of C1, wherein responsively to activation of the trigger signal, the terminal captures into the buffer memory K frames, the K frames being frames captured subsequent to the activation of the trigger signal.

C3. The terminal of C1, wherein responsively to the activation of the trigger signal the terminal transmits from the buffer memory to the storage memory one or more frame captured prior to the time of the activation of the trigger signal and one or more frame captured subject to the activation of the trigger signal.

C4. The terminal of C1, wherein the terminal is operative to attempt to decode a decodable indicia a frame of the plurality of frames.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

I claim:

1. A terminal comprising:
a first imaging assembly having a first imaging axis, a first image sensor pixel array, and an imaging lens focusing light on the first image sensor pixel array;
a second imaging assembly having a second imaging axis, a second image sensor pixel array, and an imaging lens focusing light on the second image sensor pixel array;
a hand held housing encapsulating the first image sensor pixel array and the second image sensor pixel array;

a display extending in a display plane disposed on the hand held housing;

a buffer memory;

a storage memory;

wherein the terminal is operative so that prior to activation of a trigger signal the terminal captures into the buffer memory a plurality of frames of image data, the buffer memory buffering the plurality of frames, the plurality of frames being frames captured utilizing the first imaging assembly and the second imaging assembly;

wherein the terminal is configured so that subsequently to activation of a trigger signal the terminal is operative to display a plurality of indicators corresponding to a set of frames captured prior to the time of activation of the trigger signal, the set of frames including one or more frame captured utilizing the first imaging assembly and one or more frame captured utilizing the second imaging assembly;

wherein the terminal responsively to selection of a certain indicator of the one or more indicator by an operator archives the frame corresponding to the certain indicator.

2. The terminal of claim 1, wherein the terminal when the terminal archives the frame, the terminal retains a selected frame in the storage memory and erases non-selected frames from the storage memory.

3. The terminal of claim 1, wherein the terminal responsively to activation of the trigger signal transmits one or more frame buffered in the buffer memory into the storage memory.

4. The terminal of claim 1, wherein the terminal when the terminal archives the frame, stores the frame into the storage memory.

5. The terminal of claim 1, wherein the terminal is adapted so that the first imaging axis extends forward from the terminal toward a target wherein the second imaging axis extends downward from the terminal toward a target.

6. The terminal of claim 1, wherein the first imaging axis and the second imaging axis are in diverging relation.

7. The terminal of claim 1, wherein the first imaging axis and the second imaging axis are in converging relation.

8. The terminal of claim 1, wherein the terminal is operative to display the one or more indicator responsively to the activation of the trigger signal.

9. The terminal of claim 1, wherein the terminal is operative to attempt to decode a decodable indicia of a frame of the plurality of frames.

* * * * *